US009064037B2

(12) United States Patent
Basava et al.

(10) Patent No.: US 9,064,037 B2
(45) Date of Patent: Jun. 23, 2015

(54) AUTOMATED CORRELATION AND ANALYSIS OF CALLSTACK AND CONTEXT DATA

(71) Applicant: Microsoft Corporation, Redmond, WA (US)

(72) Inventors: Shibani Basava, Redmond, WA (US); Bertan Aygun, Issaquah, WA (US); Philip Edward Price, Seattle, WA (US); Roman Golovin, Redmond, WA (US); Anton Kolesnyk, Redmond, WA (US); Nathan Ryan Halstead, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 13/715,879

(22) Filed: Dec. 14, 2012

(65) Prior Publication Data

US 2014/0173359 A1     Jun. 19, 2014

(51) Int. Cl.
*G06F 11/00* (2006.01)
*G06F 11/34* (2006.01)
*G06F 11/32* (2006.01)

(52) U.S. Cl.
CPC ............ *G06F 11/3409* (2013.01); *G06F 11/34* (2013.01); *G06F 2201/86* (2013.01); *G06F 11/323* (2013.01); *G06F 11/3466* (2013.01); *G06F 2201/81* (2013.01); *G06F 11/3423* (2013.01)

(58) Field of Classification Search
CPC ................................. G06F 11/34; G06F 11/32
USPC .......................................................... 714/46
See application file for complete search history.

(56) References Cited

U.S. PATENT DOCUMENTS

| | | | |
|---|---|---|---|
| 6,779,180 B1 * | 8/2004 | Palm | 718/100 |
| 7,379,999 B1 | 5/2008 | Zhou et al. | |
| 7,546,587 B2 * | 6/2009 | Marr et al. | 717/127 |
| 7,730,460 B1 * | 6/2010 | Warren et al. | 717/133 |
| 8,015,552 B1 | 9/2011 | Lindahl et al. | |
| 8,032,867 B2 | 10/2011 | Bansal | |

(Continued)

FOREIGN PATENT DOCUMENTS

WO     2006113111 A2     10/2006

OTHER PUBLICATIONS

Basava, Shibani et al., "Immediate Delay Tracker Tool," pending U.S. Appl. No. 131241,229, filed Sep. 23, 2011.

(Continued)

*Primary Examiner* — Amine Riad
(74) *Attorney, Agent, or Firm* — Kevin Sullivan; Kate Drakos; Micky Minhas

(57) ABSTRACT

Embodiments allow a user to define event scenarios that are used to analyze callstack and context data. Scenarios that are delayed are flagged and reported to the user with an aggregated callstack of CPU samples taken during the delay. An aggregation is done for samples for the main user interface thread of the process that is being monitored. A user may select other threads to see the callstack aggregation for that thread. The user can identify which methods use the most time for a particular delay from the callstack presentation. An event analysis tool allows quick exploration of the responsiveness issues by visualizing delays as they happen and allowing the user to drill down into callstack details for selected delays.

18 Claims, 6 Drawing Sheets

(56) References Cited

U.S. PATENT DOCUMENTS

| | | | |
|---|---|---|---|
| 8,166,022 B2 | 4/2012 | Han et al. | |
| 8,286,139 B2* | 10/2012 | Jones et al. | 717/128 |
| 8,307,246 B2* | 11/2012 | Shochat et al. | 714/38.1 |
| 8,607,201 B2* | 12/2013 | Chen et al. | 717/125 |
| 8,635,696 B1* | 1/2014 | Aziz | 726/23 |
| 8,719,791 B1* | 5/2014 | MacPherson et al. | 717/124 |
| 8,839,271 B2* | 9/2014 | Jones et al. | 719/318 |
| 2009/0241095 A1* | 9/2009 | Jones et al. | 717/128 |
| 2010/0107014 A1* | 4/2010 | Shochat et al. | 714/37 |
| 2010/0318852 A1 | 12/2010 | Zheng et al. | |
| 2011/0099550 A1 | 4/2011 | Shafi | |
| 2012/0159449 A1* | 6/2012 | Arnold et al. | 717/125 |
| 2013/0080502 A1* | 3/2013 | McColl et al. | 709/203 |
| 2014/0215442 A1* | 7/2014 | Rabin | 717/125 |

OTHER PUBLICATIONS

Basava, Shibani et al., "User Interface Responsive Monitor," pending U.S. Appl. No. 13/241,249, filed Sep. 23, 2011.

Park, Insung et al., "Improve Debugging and Performance Tuning with ETW," MSDN Magazine, Apr. 2007, (10 pages).

Micro Focus, "Devpartner Performance Analysis Suite 10.6," Data Sheet, 2012, (3 pages).

Dynatrace, "Continuous Application Performance for Enterprise NET Systems," Brochure, (date unknown), (21 pages).

"International Search Report & Written Opinion for PCT Patent Application No. PCT/US2013/075215", Mailed Date: Oct. 28, 2014, 12 Pages.

* cited by examiner

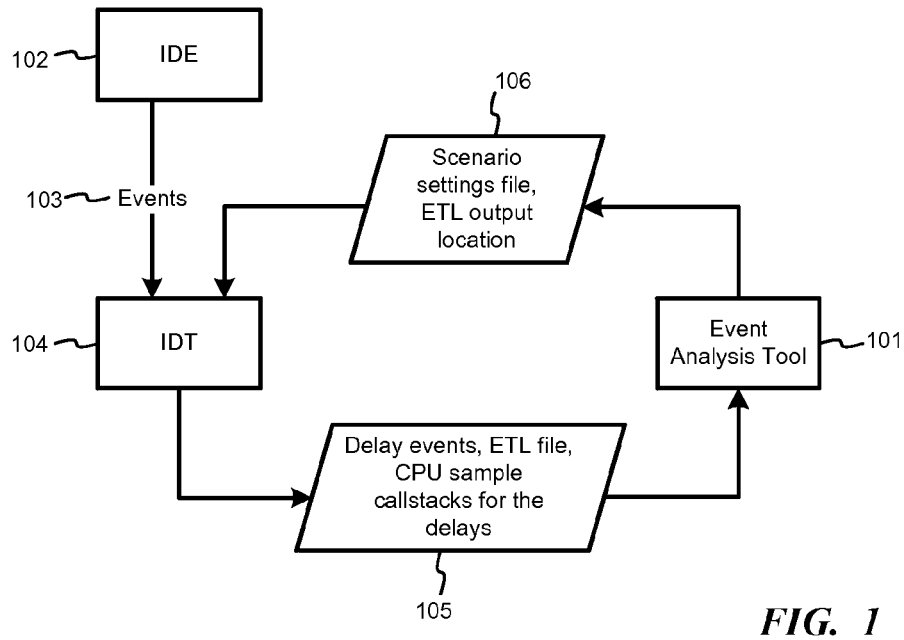

FIG. 1

| | Enabled | Name | Minimum Delay Time | Markers |
|---|---|---|---|---|
| | ☒ | IdleDelay | 50 | Code Marker, Id=9444 |
| | ☒ | Input Delay | 75 | Code Marker, Id=9445 |
| | ☒ | Unresponsive | 500 | Code Marker, Id=9447<br>Code Marker, Id=9446 |
| | ☒ | Menu Delay | 100 | Code Marker, Id=9449<br>Code Marker, Id=9450 |
| | ☒ | ScrollingDelay-Editor | 75 | Measurement Block;<br>Category=VsTextEditor.Scroll.*,<br>Type=Begin<br>Editor Render |

602 = Enabled, 603 = Name, 604 = Minimum Delay Time, 605 = Markers, 601 = table

FIG. 6

AUTOMATED CORRELATION AND ANALYSIS OF CALLSTACK AND CONTEXT DATA

BACKGROUND

In current integrated development environments (IDE), investigating performance issues is a manual process that requires taking a "trace" or "profile" of an operation and then reviewing inclusive and exclusive CPU samples to determine where performance is being impacted. This manual analysis is time consuming, and there is a big learning curve for the current performance tools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments allow a user to define event scenarios that are used to analyze callstack and context data. Scenarios that are delayed are flagged and reported to the user with an aggregated callstack of CPU samples taken every 1 ms during the delay. This allows the user to identify which methods used the most time for a particular delay. An event analysis tool allows quick exploration of the responsiveness issues by visualizing delays as they happen without requiring analysis after the fact.

Embodiments automatically correlate event start and stop times within one trace to scenarios that are defined in a settings file. A delay is detected when the time elapsed to receive a start and end event exceeds a scenario limit. The methods or threads that are impacted by the delay are listed for the user.

A graphical representation of the delays is provided in real time and allows the user to quickly navigate to the callstack for the impacted activity/scenario for a particular thread right from the delay list after processing. The callstack is an aggregated view of CPU samples taken every 1 ms from the start of the delay to the end.

The hottest path in the scenario is determined by highlighting all frames that spend time more than twenty percent of the whole delay time in a method or any method called from this method. For example, all methods that spend more than twenty percent of the total delay time are highlighted. The twenty percent includes any time that is spent in other methods called by a method. However, that called method is not flagged if it spends less than twenty percent of the total delay time. Additional asset information, such as module loads, disk file reads, etc., and other events that happen between the start and end of a delay are also available to the user. These results may be filtered by module using user-selected filter criteria to identify exactly which delays are associated with selected code in the callstack.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates the areas of responsibility for various components associated with the event analysis tool and the information being exchanged by the components.

FIG. 6 illustrates an interface that allows users to edit existing scenarios 601 from the event analysis tool.

DETAILED DESCRIPTION

Figure 2:
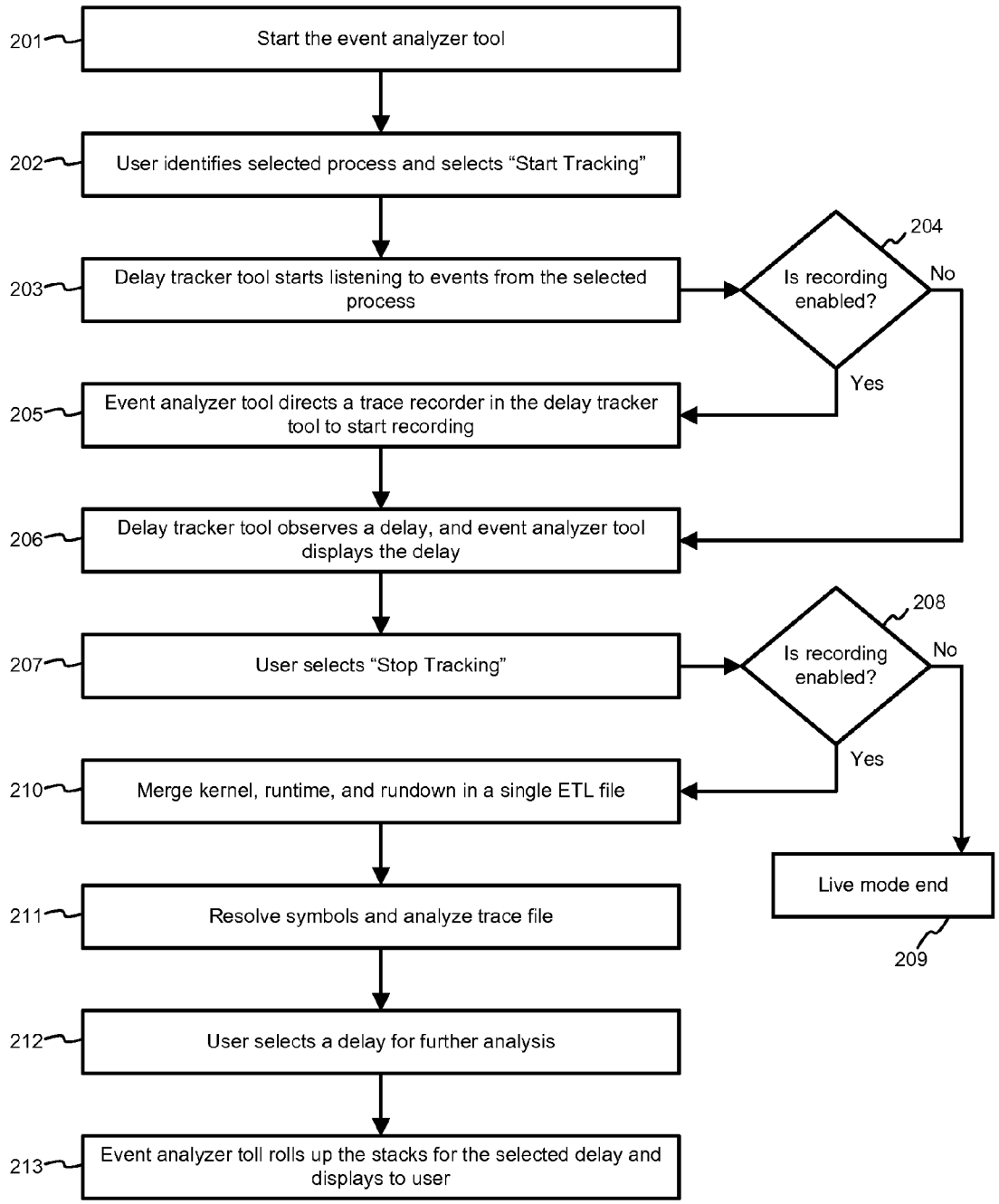
FIG. 2 is a flowchart illustrating a method or process for analyzing events according to one embodiment.

Various embodiments are directed to an event analysis tool that automatically correlate event start and stop times within one trace and provide a list of impacted activities and scenarios to a user. The event start and stop times correspond to scenarios, which may be defined in a settings file or may be provided by the user. The event analysis tool may use a delay tracker such as a mechanism for tracking delays in responding to user inputs that require an immediate response. In one embodiment, an Immediate Delay Tracker (or IDT) library is used to track delays in the response time of user actions so that the source of the delay may be identified and remedied. An example of an Immediate Delay Tracker tool is described in pending U.S. patent application Ser. No. 13/241,229, filed Sep. 23, 2011, and titled "Immediate Delay Tracker Tool," the disclosure of which is hereby incorporated herein by reference in its entirety. In other embodiments other delay tracker systems may be used with the event analysis tool described herein. One example of such a delay tracker system is described in pending U.S. patent application Ser. No. 13/241,249, filed Sep. 23, 2011, and titled "User Interface Responsiveness Monitor," the disclosure of which is hereby incorporated herein by reference in its entirety.

The IDT identifies and records delays that occur during an application execution. The IDT looks for a sequence of events raised by an IDE application to identify scenarios that are defined in a settings file or data structure. A "delay" is identified when a scenario—i.e., the length of time elapsed to receive a certain sequence of events—exceeds its allowable threshold. Delays are typically measured in CPU tick counts and then converted to milliseconds when presented to user or while compared to limits in the settings file. A settings file or data structure contains information about the sequence of events that define a scenario and includes the millisecond threshold at which the scenario is considered a delay. The event analysis tool described herein, which is referred to as "RaceTrack" in one embodiment, receives delay information from the user, such as scenario definitions, and supplies that delay information to the IDT library. The event analysis tool uses the IDT to listens to events generated by an application under observation. The event analysis tool reports when a delay is found by presenting delay information in a graphical and/or list representation.

In addition to tracking delays, an IDT library may also provide a component to record kernel, runtime (e.g., CLR runtime provider), and rundown traces (e.g., CLR rundown) and then merge this information into a single ETL (Extract, Transform and Load) log file. The IDT library generates events when a delay is detected and when it finishes recording. The event analysis tool subscribes to these events to generate a timeline or list showing which delays were found. The event analysis tool allows the user to start recording a kernel ETL trace file that contains CPU samples, context switches, disk IO, module loads, etc. The CPU samples may be, for example, a callstack taken every 1 ms from the application. The user is able to see delays that happen live and may stop the recording at any time when a delay occurs. Once the user stops the recording, the trace is processed and analyzed. The kernel, runtime, and rundown traces are merged together and symbols are downloaded and resolved.

The event analysis tool provides a graphical representation of the delays in real time and allows the user to quickly navigate to the callstack for the impacted activity/scenario for a particular thread right from the delay list after processing. The stack is an aggregated view of CPU samples taken every 1 ms during the delay.

The user is presented with the list of delays encountered during a selected scenario in a graphical representation as well as a simple list. The graphical representation charts the timeline of the application's execution and illustrates the duration of each operation, such as by the length of a bar or other indication, so that the user can quickly see which operation took the longest time to execute.

The event analysis tool allows for quick exploration of the application and navigation to the callstack responsible for each delay with one click from a timeline or delay list. After a trace has been processed, the user may click on a delay from the graph or list and see an aggregation of all CPU samples and context switches that fall between the start and ending timestamp of the event sequence for the delay. In some embodiments, the event analysis tool filters samples from a main thread of the IDE when those samples cause the delays seen by the user.

An aggregated tree may be presented to show all of the different forks made in the callstack during the delay execution and to indicate how much time was spent in each frame with respect to the total delay time. The aggregated callstack shows where the most time was being spent during the delay.

In other embodiments, the event analysis tool highlight the "hottest" path in the scenario by highlighting all frames that spend time more than twenty percent of the entire delay time in a particular method or in any method called from this particular method. All methods that spend more than twenty percent of the total delay time are highlighted. The twenty percent time includes any time spent in other methods called by this method. However, that called method is not flagged if its time is less than twenty percent of the total delay time.

The event analysis tool shows asset information such as component loaded, which key was typed, module loads, and other events that occur between the start and end of a delay. When the event analysis tool receives an event, such as module load and package load, it extracts information to determine which module or component was loaded. Similarly, when a key press event is received, the tool parses out the information on what key was pressed.

The user can select a delay or other criteria to filter the list of events displayed by the event analysis tool so that only those events that happen during the span of the delay are shown. This shows the user all the assets, such as component loaded or key typed, and events that concern a selected delay.

In order to further simplify delay analysis for the user, the event analysis tool allows the delays to be filtered by modules that come into execution during an operation. The delays may be filtered by module to identify exactly which delay has the selected code in its stack. This helps to narrows the field of investigation when the user is focused on certain modules or code. Only those delays that contain the module in question will be displayed to the user, reducing the overhead of having to sift through a number of unrelated delays.

FIG. 1 illustrates the areas of responsibility for various components associated with the event analysis tool 101 and the information being exchanged by the components. An IDE 102 provides events 103 to a delay tracker, such as an IDT 104. The events 103 may include, for example, code markers or measurement blocks. IDT 104 listens to the events 103 in view of scenarios defined in a settings file or user profile. IDT 104 flags delays observed in any scenarios and records ETL files.

IDT 104 detects delays in an application and collects callstacks at regular intervals while the application is running. In one embodiment, the callstacks are collected in CPU samples every 1 ms. IDT 104 provides the delay events, ETL files, or CPU sample callstacks 105 to the event analysis tool 101, which uses the information for analysis of the application. For example, event analysis tool 101 may aggregate the callstacks for different scenarios. The event analysis tool 101 may provide the following types of information to a user, among others: graphical and list representations of the delays, callstack rollup with hot path displayed, contextual information on the delays, and filtered delays by module and other criteria.

Event analysis tool 101 starts and stops recording events as directed by the user. For example, a user may select a "start recording" or "end recording" option on the event analysis tool 101 to indicate when the events should be collected. Event analysis tool 101 displays the delays to the user. Event analysis tool 101 also displays the delays to the user, rolls up the callstack information, and displays asset information. Event analysis tool 101 uses this information and generates a display showing the delays on a time line.

Event analysis tool 101 provides configuration information 106 to IDT 104, such as a scenario settings file, an ETL output location, and other information. Using this configuration information 106, IDT 104 then sends information 105 to the event analysis tool 101.

FIG. 2 is a flowchart illustrating a method or process for analyzing events according to one embodiment. In step 201, the user starts the event analysis tool. The event analysis tool is configured to receive inputs, such as delay event information, from a delay tracker tool, such as an IDT. In step 202, the user identifies a process of interest and selects "Start Tracking" on the event analysis tool. The user may start the tracking, for example, by selecting a button on a user interface.

In step 203, the delay tracker tool begins listening to events collect the information from the selected process. At 204, the event analysis tool determines if recording is enabled. If recording is enabled in step 204, then the event analysis tool directs a trace recorder in the delay tracker tool to start recording in step 205. The delay tracker tool records and processes an ETL file, for example.

If recording is not enabled in step 204, then the process moves to step 206. When the delay tracker tool sees a delay in the selected process, the event analysis tool displays the delay in step 206. The delays may be displayed live on a graph or timeline, for example, as they occur and/or are detected. While tracking is still active, the delays are not further processed at this point.

In step 207, the user selects "Stop Tracking," and, in step 208, the event analysis tool determines again if recording is enabled. If recording is not enabled, then the event analysis tool ends the live mode at step 209 and no longer updates or analyzes the delay events.

If recording is enabled, then in step 210 recorded kernel, runtime, and rundown traces are merged into a single ETL log file. In step 211, the event analysis tool resolves symbols and analyzes the ETL trace file. In other embodiments, the symbol resolution may occur in the IDT.

In step 212, the user can select a delay for further analysis. In step 213, the event analysis tool rolls up the callstacks for the selected delay and displays to the user.

Figure 3:
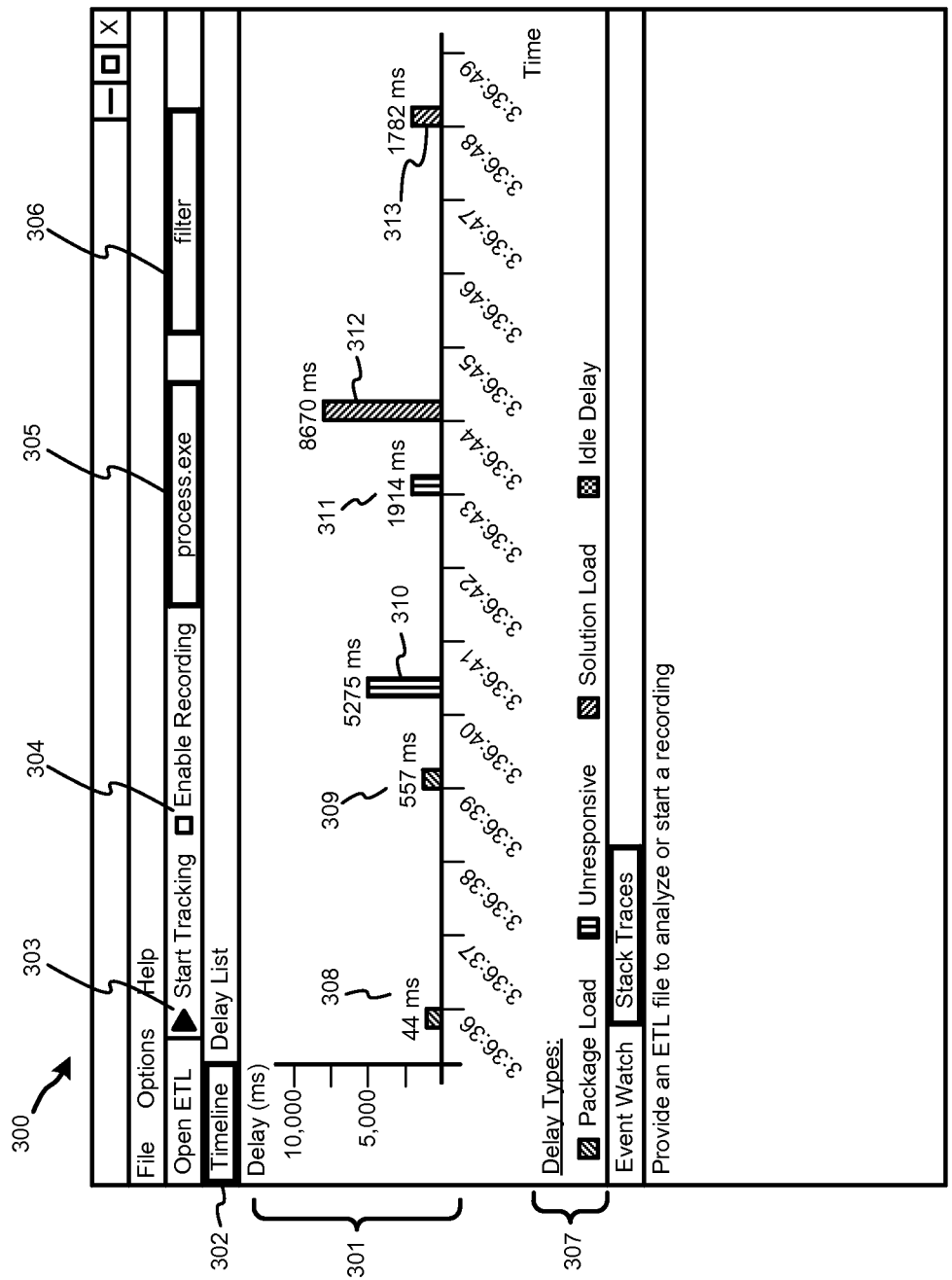
FIG. 3 is an example display for an event analysis tool for recording and displaying delays in a process.

FIG. 3 is an example display 300 for an event analysis tool for recording and displaying delays in a process. The timeline 301 shows the type of delays observed and how long each delay took. The user may select to view the timeline with option 302, begins tracking with option 303, and enables recording with option 304. The selected process is identified in field 305 and any filter selected is shown in field 306.

A number of different delay types 307 may be displayed and analyzed. These delays may be associated with a scenario that is defined by the user or in a setting file. Each delay type is associated with a different pattern or color that is used on timeline 301 to identify the observed delay types. For example, package load delays 308 and 309 were detected at time 3:36:36 and 336:39, respectively. Package load delay 308 lasted 44 ms, and package load delay 309 lasted 557 ms. Other delays, such as unresponsive delays 310, 311 and solution load delays 312, 313 are also displayed as they are detected.

Each delay is shown with a corresponding time that indicates how long the delay lasted. The delays are shown on timeline 301 when an event lasts longer than a maximum setting for that scenario.

When the tracking ends, such as by the user unselecting option 303, then the event analysis tool begins analyzing the trace file and resolving the symbols to show the user callstack rollups.

Figure 4:
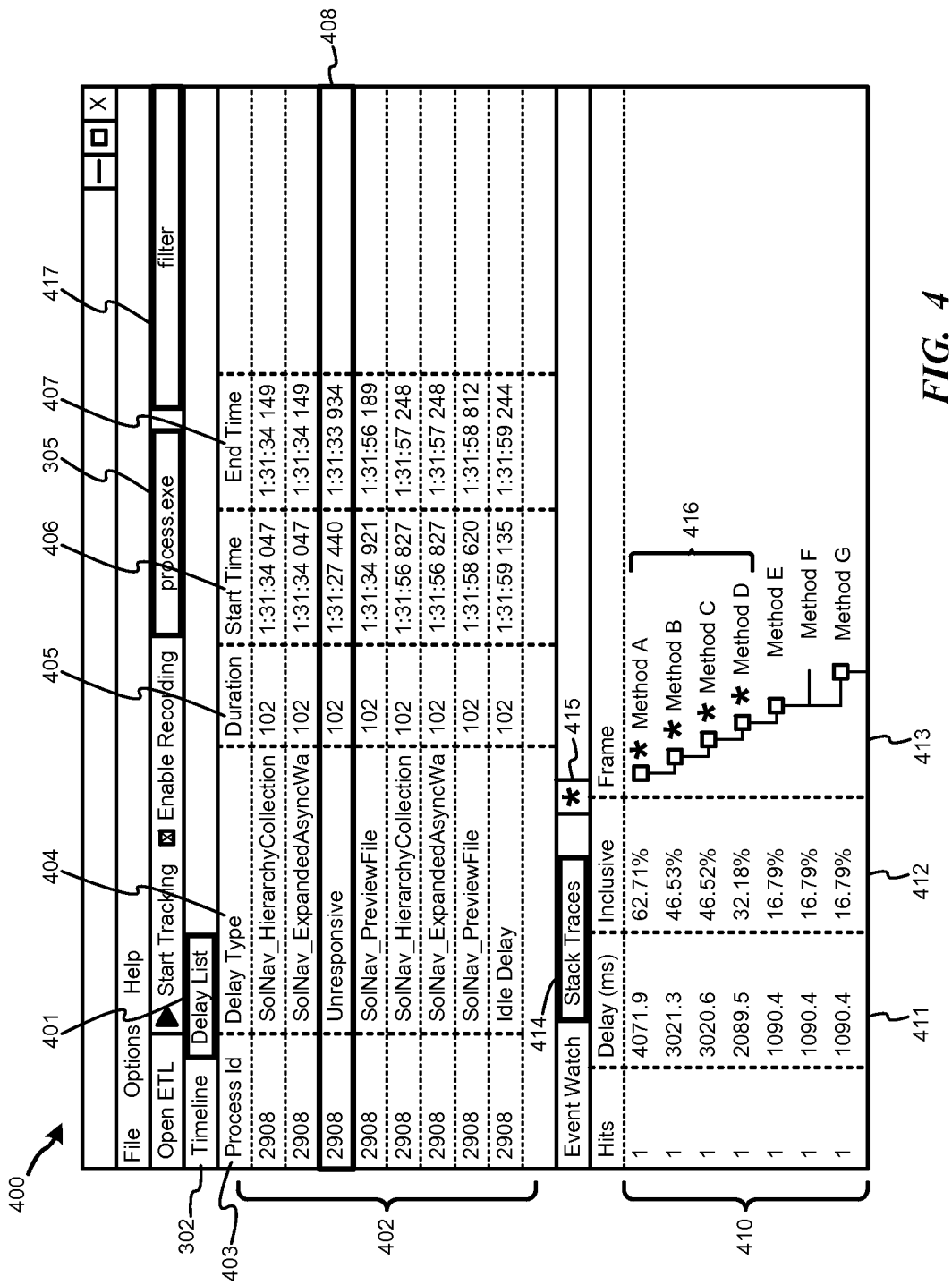
FIG. 4 is an example display for the event analysis tool that shows the callstacks for a selected delay.

FIG. 4 is an example display 400 for the event analysis tool that shows the callstacks for a selected delay. Delay List option 401 is selected in display 400 (instead of Timeline option 302), which generates a list of delays 402. The delays 402 are associated with the selected process 403. Each delay type 404 is listed along with the duration 405 of the delay. A start time 406 and end time 407 for each delay is also shown.

The user has selected delay 408 in this example, which a list 410 of the specific methods involved with this delay. List 410 indicates what methods were called during the selected delay 408 so that the user can determine what methods are relevant to different delays. The methods are arranged in the order each of them were called. For example, in group 416, Method A was the entry point into the IDE; it called Method B, which called Method C, and so on. When a fork is seen, for example from Method E to Method F and Method G, it indicates that Method E called both Method F and Method G during the delay and some time was spent in each. The duration in column 411 shows how much time was being spent in each method (and the methods called by this method) inclusively. Additionally, there is an indication 412 of the time spent in each method as a percent of the overall delay time. This allows the user to quickly see which methods contribute the most delay. The duration 411 and inclusive percent 412 represent the time spent in the method and all the methods called by the listed method as shown in expanded frames 413. If Method A is the entry point, one-hundred percent of the total time for delay 408 is spent in Method A, and that percentage of time decreases when the code path gets closer to the actual methods (e.g., Methods F, G) that the operation required to be executed.

The list of methods is shown when a Stack Traces option 414 is selected. Additionally, the user may select a Hot Path option 415 that indicates which methods take up the most time. The Hot Path methods may be indicated by a flame, star, flag, or other icon. The Hot Path methods include which set of method were the most expensive or most difficult to execute. In one embodiment, the Hot Path methods 416 include any method that took more than twenty percent of the total delay time (412) to execute. The Hot Path limit may be adjusted to set a higher or lower limit as desired by the user. The Hot Path methods 416 indicate the areas that had the most impact on the selected scenario. The Hot Path shows which code path from the entry point were potentially the reason that the delay happened.

In other embodiments, the delay list 402 for the process can be filtered in field 417. For example, the user may select a particular module in filter 417 and then only the delays that contain any activity from the selected module will be shown in list 402. This would allow developers to determine, for example, how their extensions add delay to process 305.

Figure 5:
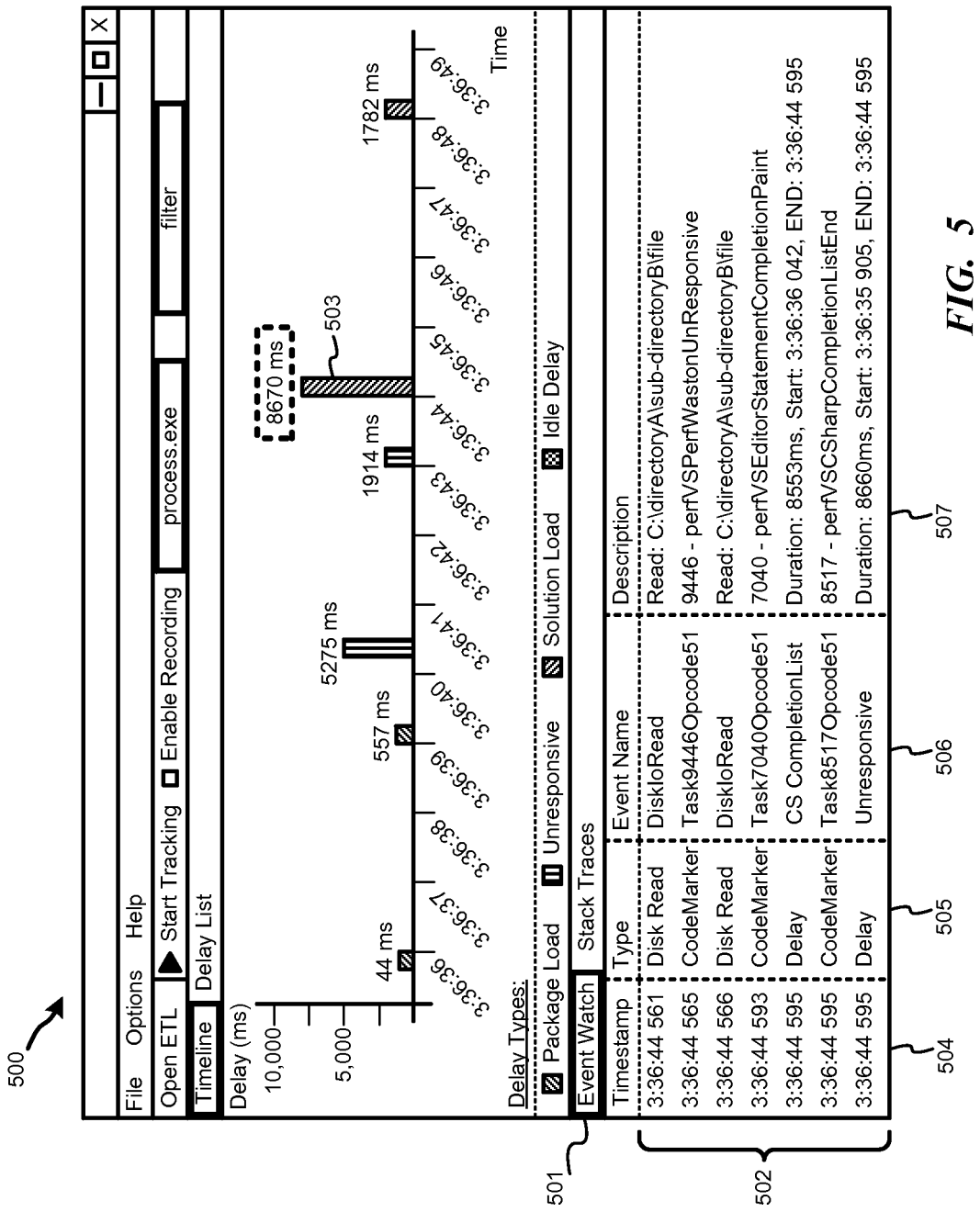
FIG. 5 is an example display for the event analysis tool that shows context information for a selected delay.

FIG. 5 is an example display 500 for the event analysis tool that shows context information for a selected delay. When the user selects the Event Watch option 501 a list of context information 502 is displayed. The Event Watch option 501 is available in both the Timeline (302) and Delay List (401) configurations. The callstack pane may also be displayed in both the Timeline (302) and Delay List (401) configurations. The user selects, such as by clicking on, a delay 503 on the Timeline in this example. The context information may indicate, for example, module loads, disk file reads, code markers, keys typed, etc. Each event in list 502 includes a timestamp 504, type 505, event name 506, and description 507.

FIG. 6 illustrates an interface 600 that allows users to edit existing scenarios 601 from the event analysis tool. The scenario information is provided to the delay tracker tool library to determine which activities to flag in a process.

The user may select which delay events to monitor by enabling individual scenarios in column 602. The name of each delay event is listed in column 603. The minimum delay time defined to identify each delay event is listed in column 604. Markers for each event are shown in column 605.

Interface 600 may be used to configure a setting file that defines a threshold for each scenario that might be observed in the delay tracker tool. The event analysis tool flags and displays an event if its delay exceeds this threshold.

Figure 7:
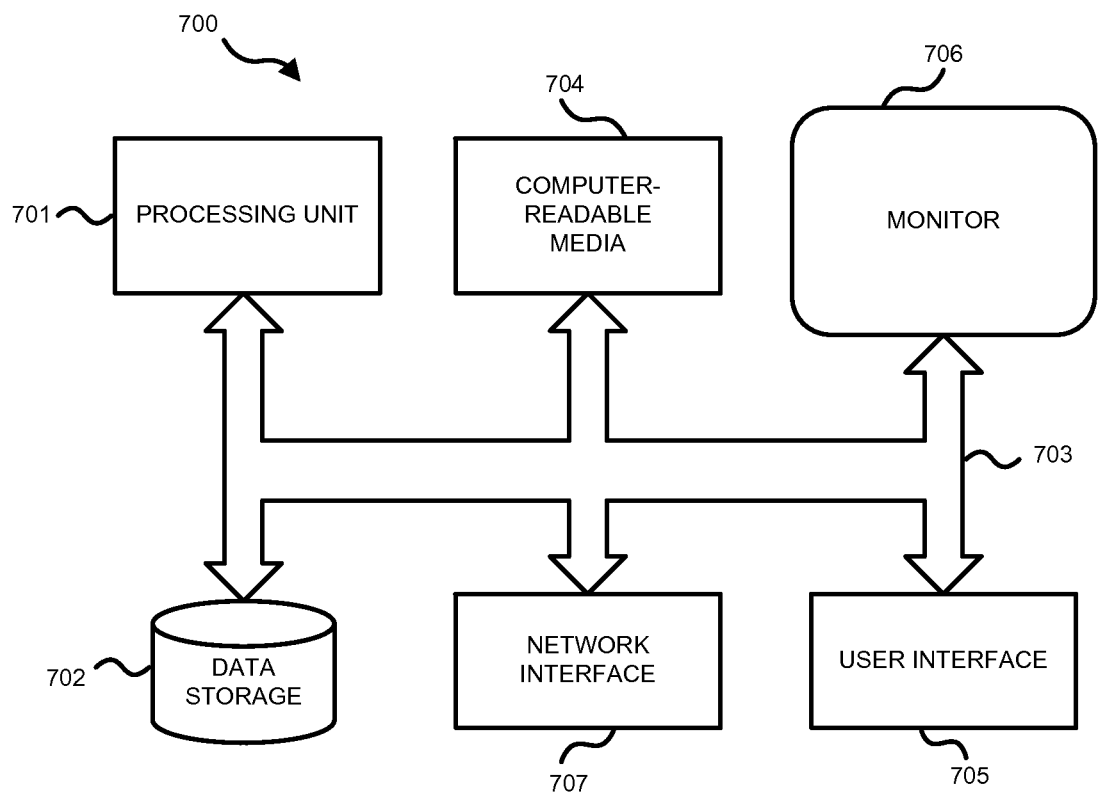
FIG. 7 illustrates an example of a suitable computing and networking environment for the event analysis tool, delay tracker tool, or IDE.

FIG. 7 illustrates an example of a suitable computing and networking environment 700 on which the examples of FIGS. 1-6 may be implemented to provide an IDE, delay tracker tool, event analysis tool, and/or settings file. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    receiving, by a computer system, event information from a delay tracker tool, wherein the event is a delay, and wherein the event information is associated with delays in a process being monitored by the delay tracker tool;
    recording, by the computer system, the event information;
    displaying, by the computer system, the event information to a user;
    receiving, by the computer system, a user selection of an event; and
    displaying, by the computer system, a callstack associated with the selected event, wherein the callstack comprises CPU samples taken at predetermined intervals during the event, and wherein each predetermined interval is 1 ms.

2. The computer-implemented method of claim 1, further comprising:
    filtering, by the computer system, the event information using filter criteria selected by the user; and
    displaying, by the computer system, modified event information comprising only event information that is associated with the filter criteria.

3. The computer-implemented method of claim 2, wherein the filter criteria comprise a module selected by the user, and wherein the modified event information comprises only delays associated with the selected module.

4. The computer-implemented method of claim 2, further comprising:
    displaying, by the computer system, a modified callstack comprising only information that is associated with the filter criteria.

5. The computer-implemented method of claim 1, further comprising:
    marking, by the computer system, one or more callstack entries to indicated that the callstack entries are associated with an event that exceeds a minimum threshold.

6. The computer-implemented method of claim 5, wherein marking includes marking one or more callstack entries that lasted more than a selected percentage of a total delay time.

7. The computer-implemented method of claim 1, wherein displaying the event information to the user further comprises:
    in response to a user selection, displaying, by the computer system, a timeline representing the occurrence of delays at specific times, or displaying a list of delays observed in the process.

8. A computer-implemented method, comprising:
    recording, by a computer system, delay information from a delay tracker tool, the delay information corresponding to events that exceed a minimum delay time specified in a scenario definition, wherein the events are delays;
    displaying, by the computer system, the delay information to a user either as a timeline showing the chronological occurrence of the delays or as a delay list;
    receiving, by the computer system, a user input indicating a selected delay; and
    displaying, by the computer system, a callstack for the selected delay, the callstack representing CPU samples taken at defined intervals during the selected delay, the callstack comprising CPU samples taken at predetermined intervals during the event, each predetermined interval being 1 ms.

9. The computer-implemented method of claim 8, further comprising:
    receiving, by the computer system, a user input indicating a selected filter; and
    displaying, by the computer system, modified delay information comprising only delays that are associated with the selected filter criteria.

10. The computer-implemented method of claim 8, further comprising:
    marking, by the computer system, callstack entries that are associated with a delay that is longer than a selected minimum duration.

11. The computer-implemented method of claim 8, further comprising:
    marking, by the computer system, one or more callstack entries that lasted more than a pre-selected duration of time deemed as tolerable to a user.

12. The computer-implemented method of claim 8, further comprising:
    displaying, by the computer system, asset information.

13. The computer-implemented method of claim 12, wherein the asset information further comprises disk file reads, keys typed, or module loads.

14. A computer system, comprising:
    one or more processors;
    a memory coupled to the one or more processors, the memory having stored thereon computer-executable instructions that, upon execution by the one or more processors, cause the computer system to:
        record delay information from a delay tracker tool, the delay information corresponding to events that exceed a minimum delay time specified in a scenario definition, the events comprising delays;
        display the delay information to a user either as a timeline showing the chronological occurrence of the delays or as a delay list;
        receive a user input indicating a selected delay; and
        display a callstack for the selected delay, the callstack representing CPU samples taken at defined intervals during the selected delay, the callstack comprising CPU samples taken at predetermined intervals during the event, each predetermined interval being 1 ms.

15. The computer system of claim 14, wherein the computer-executable instructions, upon execution by the one or more processors further cause the computer system to:
    receive a user input indicating a selected filter; and
    display modified delay information comprising only delays that are associated with the selected filter criteria.

16. The computer system of claim 14, wherein the computer-executable instructions, upon execution by the one or more processors further cause the computer system to:
    mark callstack entries that are associated with a delay that is longer than a selected percentage of a total delay.

17. The computer system of claim 14, wherein the computer-executable instructions, upon execution by the one or more processors further cause the computer system to:
    display asset information.

18. The computer system of claim 14, wherein the computer-executable instructions, upon execution by the one or more processors further cause the computer system to:
    receive user modifications to the scenario definitions in a settings file.

\* \* \* \* \*